3,576,617
METHOD OF PROMOTING THE GROWTH
OF PLANTS
Eugene P. Di Bella, 168 Chestnut St.,
Rochelle Park, N.J. 07662
No Drawing. Original application Jan. 21, 1965, Ser. No. 427,095. Divided and this application Nov. 25, 1969, Ser. No. 879,947
Int. Cl. A01n 9/14; C07c 143/24
U.S. Cl. 71—103          10 Claims

ABSTRACT OF THE DISCLOSURE

Salts of 2,3,6-trichlorotoluene-5-sulfonic acid, such as sodium 2,3,6-trichlorotoluene-5-sulfonate and monomethylammonium 2,3,6-trichlorotoluene-5-sulfonate, can be used to stimulate plant growth without causing visible damage to the plant.

---

This is a division of my copending patent application Ser. No. 427,095, which was filed on Jan. 21, 1965.

This invention relates to a method of promoting the growth of plants. More particularly, it relates to a method of promoting the growth of plants by applying to the plants salts of polychlorotoluenesulfonates.

In accordance with this invention, it has been found that certain salts of polychlorotoluenesulfonic acids possess the unusual and valuable property of stimulating plant growth without causing visible damage to the plant. These compounds have the structure

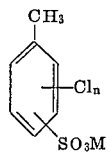

wherein $n$ represents an integer in the range of 2 to 3 and M represents an alkali metal, such as sodium, potassium, and lithium; an alkaline earth metal, such as calcium, barium, magnesium, and strontium; ammonium; (lower alkyl)-ammonium, such as monomethylammonium, monoethylammonium, monopropylammonium, monobutylammonium, dimethylammonium, diethylammonium, dipropylammonium, dibutylammonium, and methylethylammonium; and (lower alkanol)-ammonium, such as monomethylolammonium, monoethanolammonium, monopropanolammonium, monobutanolammonium, dimethylolammonium, diethanolammonium, dipropanolammonium, dibutanolammonium, and methylolethanolammonium. The preferred products are those in which the chlorine atoms and the —SO₃M group are in the 2, 3, 5, and 6 positions of the aromatic ring. Particularly preferred are those compounds in which the chlorine atoms are in the 2 and 6 positions or the 2, 3, and 6 positions and the —SO₃M group is in the 5 position of the ring. These compounds may be represented by the structure

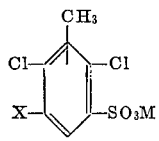

wherein X represents hydrogen or chlorine and M has the aforementioned significance. Illustrative of these compounds are the following: sodium 2,6-dichlorotoluene-3-sulfonate, barium 2,6-dichlorotoluene-3-sulfonate, ammonium 2,6-dichlorotoluene-3-sulfonate, dimethylammonium 2,6-dichlorotoluene-3-sulfonate, sodium 2,3,6-trichlorotoluene-5-sulfonate, calcium 2,3,6-trichlorotoluene-3-sulfonate, monoethylammonium 2,3,6-trichlorotoluene-5-sulfonate diethylammonium 2,3,6-trichlorotoluene-5-sulfonate, monopropylammonium 2,3,6-trichlorotoluene-5-sulfonate, diethanolammonium 2,3,6-trichlorotoluene-5-sulfonate, and the like.

To provide a satisfactory degree of plant growth stimulating activity, the product should contain at least 20% and preferably at least 50% of isomers having substituents in the 2, 3, and 6 positions of the ring. Products that contain from 60% to 75% of the salt of 2,6-dichlorotoluene-3-sulfonic acid or 2,3,6-trichlorotoluene-5-sulfonic acid are generally preferred because they are readily and economically prepared and because they provide good plant growth stimulation with no visible injury to the plants. While products that contain more than 75% of these isomers are also very effective as plant growth stimulators, they are usually more expensive and more difficult to prepare than those that contain from 60% to 75% of the preferred isomers. In each case the remainder of the product is made up of salts of the other isomeric polychlorotoluenesulfonic acids and reaction by-products.

The compounds of this invention may be prepared by any convenient procedure. For example, polychlorotoluene may be sulfonated with fuming sulfuric acid and the resulting polychlorotoluenesulfonic acid treated with an alkali metal halide to form a precipitate of the relatively insoluble alkali metal salt of the acid. This salt, which may be readily washed free of sulfate ions, may be converted to other salts by known techniques. For example, sodium polychlorotoluenesulfonate may be reacted with barium acetate or barium nitrate to form barium polychlorotoluenesulfonate which may in turn be treated with sulfuric acid to yield barium sulfate and an aqueous solution of polychlorotoluenesulfonic acid. The ammonium, alkylammonium, and alkanolammonium salts may be readily obtained by adding ammonia or the appropriate alkylamine or alkanolamine to the polychlorotoluenesulfonic acid solution.

In a preferred embodiment of this invention, a mixture of isomeric polychlorotoluenes containing from 60% to 75% of the 2,6-dichloro isomer or the 2,3,6-trichloro isomer is sulfonated by treating it with fuming sulfuric acid of approximately 10% to 100% and preferably 20% to 30% sulfur trioxide content to form a mixture of isomeric polychlorotoluenesulfonic acids. The sulfonation is generally carried out at a temperature in the range of 50° C. to 120° C. and preferably 70° C. to 80° C. using a 10% to 50% molar excess of fuming sulfuric acid. The reaction mixture is then diluted with an amount of water that is greater than that equivalent to the amount of unreacted sulfur trioxide that is present and sufficient to dissolve the polychlorotoluenesulfonic acid. When the resulting aqueous solution is poured into a solution containing an alkali metal halide, a voluminous precipitate of the alkali metal salt of polychlorotoluenesulfonic acid results. The distribution of isomers in the product is substantially the same as that of the polychlorotoluene used as the starting material.

The compounds of this invention may be used to stimulate the growth of a wide variety of monocotyledonous and dicotyledonous plants. They may be applied to soil or other medium that normally supports plant growth, or they may be applied to the plants themselves. In either case plant growth is stimulated without causing visible damage to the plants. This ability of salts of polychlorotoluenesulfonic acids to stimulate plant growth without injuring the plants is unexpected and surprising since it is known that the corresponding polychlorotoluenes and polychlorotoluenesulfonic acids either have no noticeable plant growth regulating properties or are phytotoxic.

The use of the processes of this invention may lead to better harvest results and to acceleration in the ripening of such crop plants as corn and beans by stimulated growth. Their use is of particular importance for promoting the growth of young plants. It permits, for example, the growth of leaf vegetable, such as lettuce, spinach, and endive, to be stimulated so that these vegetables can be marketed at an earlier date and greenhouses can be used more intensively than is ordinarily possible.

While the compounds of this invention may be applied as such to plants or to the plant growth supporting medium, they are commonly and preferably used in combination with an inert carrier. They may be mixed with or deposited upon inert finely-divided solids and applied as dusts. Such mixtures may also be dispersed in water with or without the aid of a wetting agent and the resulting aqueous suspensions applied as sprays. Alternatively, the compounds may be applied as hydrocarbons, alcohol, or ketone solutions, as oil-in-water emulsions, or as aqueous dispersions.

The concentration of the polychlorotoluenesulfonate in the composition may vary within wide limits and depends upon a number of factors, the most important of which are the amount of the composition to be applied per unit of area and the type or types of plants being treated. In most cases, the composition contains approximately 0.1 percent to 80 percent by weight of the plant growth regulating compound. The amount of the composition used is that which will provide the desired positive plant response. Generally it is used at a rate that will apply approximately 0.5 pound to 10 pounds and preferably 2 pounds to 5 pounds of the plant growth regulating compound per acre.

The invention is further illustrated by the examples that follow.

EXAMPLE 1

To 500 grams (2.56 moles) of trichlorotoluene containing 64% of 2,3,6-trichlorotoluene was added over a period of one hour 1060 grams of 25% fuming sulfuric acid (3.3 moles of $SO_3$). During the addition of the fuming sulfuric acid, the temperature of the reaction mixture was maintained at 70°–80° C. by means of external cooling. There was then added over a period of 30 minutes 1200 grams of water. The resulting mixture was heated to 120° C. to obtain complete solution and then poured into a solution of 300 grams (5.1 moles) of sodium chloride in 1000 grams of water. The voluminous precipitate that resulted was collected and washed with water, with sodium bicarbonate solution, and again with water.

After drying at 100°–110° C., there was obtained 539 grams of sodium trichlorotoluenesulfonate that contained approximately 64% of sodium 2,3,6-trichlorotoluene-5-sulfonate. The product contained 39.4% chlorine and 10.1% sulfur (calculated for $C_7H_4Cl_3SO_3Na$: 35.8% chlorine and 10.8% sulfur).

EXAMPLE 2

The sodium 2,3,6-trichlorotoluene-5-sulfonate whose preparation was described in Example 1 may be converted to other salts by the following procedures:

(A) to a mixture of 297.5 grams (1.0 mole) of sodium 2,3,6-trichlorotoluene-5-sulfonate and 1000 grams of water at 100° C. is added a solution of 150 grams (0.59 mole) of barium acetate in 800 grams of water. The resulting suspension is stirred at 90°–100° C. for 30 minutes and then cooled to room temperature. The barium salt is collected on a filter, washed with water until it is free of barium acetate and sodium acetate, and dried at 110° C. There is obtained 330 grams of barium 2,3,6-trichlorotoluene-5-sulfonate.

(B) To a suspension of 274 grams (0.8 equivalent) of barium 2,3,6-trichlorotoluene-5-sulfonate in 900 grams of water is added 40.8 grams of 96% sulfuric acid. The resulting suspension is stirred for 30 minutes and then filtered. The solid barium sulfate is washed with two 50 gram portions of water. This wash water is combined with the filtrate to give 1220 grams of an 18.1% aqueous solution of 2,3,6-trichlorotoluene-5-sulfonic acid.

(C) To 610 grams of the 18.1% aqueous solution of 2,3,6-trichlorotoluene-5-sulfonic acid (0.4 mole of the acid) is added 45 grams of a 40% aqueous solution of dimethylamine (0.4 mole of the amine). There is obtained 655 grams of a 19.5% aqueous solution of dimethylammonium 2,3,6-trichlorotoluene-5-sulfonate.

(D) To 610 grams of the 18.1% aqueous solution of 2,3,6-trichlorotoluene-5-sulfonic acid is added 105 grams of a 40% aqueous solution of diethanolamine. There is obtained 715 grams of a 21% aqueous solution of diethanolammonium 2,3,6-trichlorotoluene-5-sulfonate.

(E) To 610 grams of the 18.1% aqueous solution of 2,3,6-trichlorotoluene-5-sulfonic acid is added 70 grams of a 20% aqueous solution of ammonium hydroxide. There is obtained 680 grams of an 18.3% aqueous solution of ammonium 2,3,6-trichlorotoluene-5-sulfonate.

EXAMPLE 3

To 196 grams of trichlorotoluene containing 68% of 2,3,6-trichlorotoluene was added over a period of one hour 150 grams of 65% fuming sulfuric acid. During the addition of the fuming sulfuric acid, the temperature of the reaction mixture was allowed to rise to 120° C. Then 450 grams of water was added over a period of 30 minutes. The resulting mixture was heated to its reflux temperature to obtain complete solution and then poured into 1200 grams of a 16.6% aqueous sodium chloride solution. The resulting precipitate was collected and washed with water, with sodium bicarbonate solution, and again with water. After drying, there was obtained 217 grams of sodium trichlorotoluenesulfonate which contained 34.6% chlorine.

EXAMPLE 4

To 121 grams (0.75 mole) of 2,6-dichlorotoluene at 75°–80° C. was added 385 grams (0.97 mole) of 20% fuming sulfuric acid over a period of one hour. During the addition of the fuming sulfuric acid, the temperature of the reaction mixture was maintained at 75°–80° C. After the addition of 200 ml. of water the reaction mixture was poured into a solution of 390 grams of a 23% aqueous sodium chloride solution. The precipitate that formed was collected and washed with 500 ml. of a 10% sodium chloride solution that contained a small amount of sodium bicarbonate. After drying, there was obtained 111 grams of sodium 2,6-dichlorotoluene-3-sulfonate that contained 11% sulfur (calculated for $C_7H_5Cl_2SO_3Na$, 12% sulfur).

EXAMPLE 5

Chlorine was passed into a mixture of 95 grams (0.5 mole) of p-toluenesulfonyl chloride and 2.0 ml. of antimony pentachloride at 120° C. until the weight of the mixture had increased by 35 grams. The mixture was poured into 400 grams of 10% sodium hydroxide solution. The resulting slurry was stirred at 60°–65° C. for 2 hours and then filtered. The product was washed with cold water containing a trace of acetic acid and dried. There was obtained 78 grams of sodium 2,6-dichlorotoluene-4-sulfonate.

EXAMPLE 6

Groups of greenhouse flats containing soil were planted with seeds of the following plant species: alfalfa, buckwheat, cabbage, castor beans, corn, cotton, cowpeas, cucumber, flax, lespedeza, lima beans, oats, peanuts, peas, red clover, ryegrass, safflower, snapbeans, sorghum, soybeans, squash, sudan grass, sugar beets, and white clover. In the preemergence tests, the flats were sprayed after planting with a 0.6% solution of sodium 2,3,6-trichlorotoluene-5-sulfonate in water or with a 0.6% solution of this compound in acetone. In the post-emergence tests, the plants were sprayed with the same solutions 4 weeks after planting. The acetone solution was used at rates that would apply 2 pounds and 4 pounds of the test compound per acre; the aqueous solution was used at a rate that would apply 2 pounds of the test compound per acre. Four weeks after the application of the plant growth regulating compound, the plants were compared with untreated plants to determine the effect on their growth. In each case it was found that the plants treated with sodium 2,3,6-trichlorotoluene-5-sulfonate were larger and more vigorous than the untreated plants and had not suffered visible injury. Observations made on the treated plants for prolonged periods showed that as growth continued the plants matured normally and in many cases earlier than the controls.

Each of the other polychlorotoluenesulfonates of this invention may be used in a similar manner to promote the growth of plants.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. The method of promoting the growth of plants which comprises applying to the plants an amount sufficient to provide a plant growth stimulating effect of a plant growth regulating compound having the structure

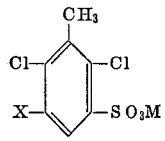

wherein X represents hydrogen or chlorine and M represents a member selected from the group consisting of alkali metals, alkaline earth metals, ammonium, (lower alkyl)-ammonium, and (lower alkanol)-ammonium.

2. The process of claim 1 wherein the plant growth regulating compound is sodium 2-6-dichlorotoluene-3-sulfonate.

3. The process of claim 1 wherein the plant growth regulating compound is sodium 2,3,6-trichlorotoluene-5-sulfonate.

4. The process of claim 1 wherein the plant growth regulating compound is barium 2,3,6-trichlorotoluene-5-sulfonate.

5. The process of claim 1 wherein the plant growth regulating compound is dimethylammonium 2,3,6-trichlorotoluene-5-sulfonate.

6. The method of promoting plant growth in a medium normally supporting plant growth which comprises applying to said medium an amount sufficient to provide a plant growth stimulating effect of a plant growth regulating compound having the structure

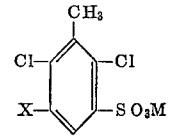

wherein X represents hydrogen or chlorine and M represents a member selected from the group consisting of alkali metals, alkaline earth metals, ammonium, (lower alkyl)-ammonium, and (lower alkanol)-ammonium.

7. The process of claim 6 wherein the plant growth regulating compound is sodium 2,6-dichlorotoluene-3-sulfonate.

8. The process of claim 6 wherein the plant growth regulating compound is sodium 2,3,6-trichlorotoluene-5-sulfonate.

9. The process of claim 6 wherein the plant growth regulating compound is barium 2,3,6-trichlorotoluene-5-sulfonate.

10. The process of claim 6 wherein the plant growth regulating compound is dimethylammonium 2,3,6-trichlorotoluene-5-sulfonate.

References Cited

UNITED STATES PATENTS

| 2,678,878 | 5/1954 | Stewart | 71—77 |

FOREIGN PATENTS

| 410,046 | 2/1925 | Germany | 71—103 |
| 445,504 | 6/1927 | Germany | 71—103 |
| 13,027 | 8/1964 | Japan | 71—103 |

JAMES O. THOMAS, JR., Primary Examiner

U.S. Cl. X.R.

71—77; 260—505

UNITED STATES PATENT OFFICE
CERTIFICATE OF CORRECTION

Patent No. 3,576,617  Dated April 27, 1971

Inventor(s) Eugene P. Di Bella

It is certified that error appears in the above-identified patent and that said Letters Patent are hereby corrected as shown below:

Column 1, line 5, after "07662" insert -- , assignor to Tenneco Chemicals, Inc., New York, N. Y., a corporation of Delaware --. Column 1, line 72, "-3-sul-" should read -- -5-sul- --. Column 3, line 58, "to" should read -- To --. Column 5, line 42, "2-6" should read -- 2,6 --.

Signed and sealed this 14th day of September 1971.

(SEAL)
Attest:

EDWARD M. FLETCHER, JR.
Attesting Officer

ROBERT GOTTSCHLAK
Acting Commissioner of Pate